United States Patent [19]
Kim et al.

[11] Patent Number: 5,573,555
[45] Date of Patent: Nov. 12, 1996

[54] DOWN BURNING SOLID FUEL BODY

[75] Inventors: Jong-Hyun Kim, Moonkyung; Mun-Sik Kim, Kyungkido, both of Rep. of Korea

[73] Assignee: Brian Ann, San Dimas, Calif.

[21] Appl. No.: 595,906

[22] Filed: Feb. 6, 1996

[30] Foreign Application Priority Data

Dec. 8, 1995 [KR] Rep. of Korea ............... 1995-47755

[51] Int. Cl.⁶ .................................................. C10L 5/38
[52] U.S. Cl. ......................... 44/533; 44/577; 44/558
[58] Field of Search .............................. 44/506, 533, 532, 44/534, 577, 558

[56] References Cited

U.S. PATENT DOCUMENTS

| | | | |
|---|---|---|---|
| Re. 27,262 | 12/1971 | Schick et al. .............................. | 44/534 |
| 2,822,251 | 2/1958 | Swinehart et al. ......................... | 44/577 |
| 4,189,305 | 2/1980 | Clayton ..................................... | 44/533 |
| 4,810,256 | 3/1989 | Fay, III et al. ............................. | 44/534 |
| 4,832,703 | 5/1989 | Campana et al. .......................... | 44/533 |
| 5,186,721 | 2/1993 | Campana .................................... | 44/533 |

*Primary Examiner*—Jacqueline V. Howard
*Attorney, Agent, or Firm*—Skjerven, Morrill, MacPherson, Franklin & Friel

[57] ABSTRACT

A down burning solid fuel body including a fire-igniting layer, a fire-catching layer and a body portion, wherein the content ratio among the fire-igniting layer, fire-catching layer and body portion is 20 to 50:40 to 45:30 to 40 based on the weight ratio. The fire-igniting layer has a composition essentially consisting of 50 to 55 wt % fine charcoal, 25 to 30 wt % barium, 5 to 10 wt % potassium nitrate, 0.3 to 0.5 wt % zeolite, 0.3 to 0.5 wt % alum, and 5 to 10 wt % starch. The fire-catching layer has a composition essentially consisting of 60 to 65 wt % fine charcoal, 20 to 25 wt % barium, 5 to 10 wt % potassium nitrate, 0.1 to 0.3 wt % zeolite, 0.1 to 0.3 wt % alum, and 5 to 10 wt % starch. The body portion has a composition essentially consisting of 85 to 90 wt % fine charcoal and 10 to 15 wt % starch.

1 Claim, No Drawings

DOWN BURNING SOLID FUEL BODY

BACKGROUND OF THE INVENTION

1. Field of the Invention

The present invention relates to a down burning solid fuel, and more particularly to a down burning solid fuel body capable of almost completely eliminating the generation of noxious gas, offensive odors, and smoke.

2. Description of the Prior Art

Typically, down burning solid fuel bodies have a structure including three portions, namely, a fire-igniting layer, a fire-catching layer and a body portion. Once the fire-igniting layer is ignited with fire, the fire-catching layer catches on fire from the fire-igniting layer. As a result, the fire moves downward from the fire-catching layer to the body portion over a period of time. In this case, the fire-igniting layer should consist of easily inflammable elements whereas the fire-catching layer should consist of elements capable of holding the fire well so that it can be definitely caught by the body portion. On the other hand, the body portion should consist of elements capable of burning for a long period time while generating a sufficient amount of heat.

Meanwhile, in such a down burning solid fuel body, a considerably long time is taken for the fire to move from the fire-igniting layer to the body portion. In this case, a large amount of offensive odor or smoke may generate if the combustion involved is imperfect. Where an excessive amount of an oxidant or catalyst is added to the solid fuel, a noxious gas may generate. In some cases, there may be a danger of an explosion.

In order to solve these problems, various methods have been proposed. However, none of these methods have perfectly solved the problems.

For example, a solid fuel, which is comprised of carbon powder or sawdust mixed with an oxidant, has been known. However, this solid fuel involves the generation of a large amount of smoke and the danger of an explosion even though it has the advantage of easy ignition.

A method, wherein barium nitrate, potassium chlorate, soda acetate, potassium permanganate or calcium permanganate is added to the fire-igniting or fire-catching layer, has also been proposed. In this case, however, noxious gas is generated along with offensive odors until the fuel body completely catches on fire.

SUMMARY OF THE INVENTION

Therefore, an object of the invention is to solve the above-mentioned problems involved in the prior art and to provide a down burning solid fuel body capable of almost completely eliminating the generation of noxious gas, offensive odors, and smoke while being inexpensive.

In accordance with the present invention, this object is accomplished by providing a down burning solid fuel body including a fire-igniting layer, a fire-catching layer and a body portion, wherein the content ratio among the fire-igniting layer, fire-catching layer and body portion is 20 to 50:40 to 45:30 to 40 based on the weight ratio, the fire-igniting layer has a composition essentially consisting of 50 to 55 wt % fine charcoal, 25 to 30 wt % barium, 5 to 10 wt % potassium nitrate, 0.3 to 0.5 wt % zeolite, 0.3 to 0.5 wt % alum, and 5 to 10 wt % starch, the fire-catching layer has a composition essentially consisting of 60 to 65 wt % fine charcoal, 20 to 25 wt % barium, 5 to 10 wt % potassium nitrate, 0.1 to 0.3 wt % zeolite, 0.1 to 0.3 wt % alum, and 5 to 10 wt % starch, and the body portion has a composition essentially consisting of 85 to 90 wt % fine charcoal and 10 to 15 wt % starch.

DETAILED DESCRIPTION OF THE PREFERRED EMBODIMENTS

The down burning solid fuel body according to the present invention includes a fire-igniting layer, a fire-catching layer and a body portion having a content ratio (weight ratio) of 20 to 50:40 to 45:30 to 40. The fire-igniting layer has a composition consisting of 50 to 55 wt % fine charcoal, 25 to 30 wt % barium, 5 to 10 wt % potassium nitrate, 0.3 to 0.5 wt % zeolite, 0.3 to 0.5 wt % alum, and 5 to 10 wt % starch (wheat flour and the like). The fire-catching layer has a composition consisting of 60 to 65 wt % fine charcoal, 20 to 25 wt % barium, 5 to 10 wt % potassium nitrate, 0.1 to 0.3 wt % zeolite, 0.1 to 0.3 wt % alum, and 5 to 10 wt % starch (wheat flour and the like). On the other hand, the body portion of the down burning solid fuel body has a composition consisting of 85 to 90 wt % fine charcoal and 10 to 15 wt % starch (wheat flour and the like).

The content ratio of the fire-igniting layer, fire-catching layer and body portion of the down burning solid fuel body according to the present invention is 20 to 25:40 to 45:30 to 40, as compared to 5 to 10:35 to 40:45 to 55 in conventional down burning solid fuel bodies. The reason why the content ratio is 20 to 25:40 to 45:30 to 40 is to achieve a perfect combustion until the fuel body completely catches on fire by increasing the contents of the fire-igniting and fire-catching layers, thereby sufficiently removing noxious gas or offensive odors generated until the fuel body completely catches on fire.

In accordance with the present invention, the starch (wheat flour and the like) is used for each component of the down burning solid fuel body as a binder which is mixed with water to bind the constituting elements of each component, thereby molding each component into a certain shape.

Barium is an oxidant which is easily imflammable and generates a flame upon being ignited.

Potassium nitrate is a catalyst which serves to achieve an easy ignition. This element is used in both the fire-igniting and fire-catching layers.

On the other hand, zeolite and alum have a property of absorbing noxious gas or odors. Even though noxious gas or offensive odors not burned by the oxidant or catalyst exist, they can be removed by the zeolite and alum.

The present invention will be understood more readily with reference to the following example; however this example is not to be construed to limit the scope of the invention.

EXAMPLE

Several solid fuel samples having different compositions as described in Tables. 1 to 5 were produced in accordance with the present invention.

TABLE 1

|  | Fire-Igniting | Fire-Catching | (unit: g) Body |
|---|---|---|---|
| Fine Charcoal | 60 | 120 | 120 |
| Barium | 30 | 45 | — |
| Potassium nitrate | 7 | 13 | — |
| Zeolite | 0.5 | 0.5 | — |
| Alum | 0.5 | 0.5 | — |
| Starch (Wheat flour) | 8 | 16 | 16 |
| Total | 106 (25 wt %) | 195 (46 wt %) | 126 (30 wt %) |
|  |  |  | (Total Weight: 427 g) |

TABLE 2

|  | Fire-Igniting | Fire-Catching | (unit: g) Body |
|---|---|---|---|
| Fine Charcoal | 60 | 125 | 115 |
| Barium | 25 | 50 | — |
| Potassium nitrate | 5 | 15 | — |
| Zeolite | 0.5 | 0.5 | — |
| Alum | 0.5 | 0.5 | — |
| Starch (Wheat flour) | 8 | 16 | 16 |
| Total | 89 (21 wt %) | 207 (46 wt %) | 131 (31 wt %) |

(Total Weight: 427 g)

TABLE 3

|  | Fire-Igniting | Fire-Catching | (unit: g) Body |
|---|---|---|---|
| Fine Charcoal | 70 | 110 | 110 |
| Barium | 35 | 40 | — |
| Potassium nitrate | 10 | 10 | — |
| Zeolite | 0.5 | 0.5 | — |
| Alum | 0.5 | 0.5 | — |
| Starch (Wheat flour) | 8 | 16 | 16 |
| Total | 124 (29 wt %) | 177 (41 wt %) | 126 (30 wt %) |

(Total Weight: 427 g)

TABLE 4

|  | Fire-Igniting | Fire-Catching | (unit: g) Body |
|---|---|---|---|
| Fine Charcoal | 70 | 130 | 90 |
| Barium | 30 | 45 | — |
| Potassium nitrate | 5 | 15 | — |
| Zeolite | 0.5 | 0.5 | — |
| Alum | 0.5 | 0.5 | — |
| Starch (Wheat flour) | 8 | 16 | 16 |
| Total | 114 (25 wt %) | 207 (44 wt %) | 106 (25 wt %) |

(Total Weight: 427 g)

TABLE 5

|  | Fire-Igniting | Fire-Catching | (unit: g) Body |
|---|---|---|---|
| Fine Charcoal | 50 | 110 | 140 |
| Barium | 20 | 55 | — |
| Potassium nitrate | 7 | 13 | — |
| Zeolite | 0.5 | 0.5 | — |
| Alum | 0.5 | 0.5 | — |
| Starch (Wheat flour) | 8 | 16 | 16 |
| Total | 86 (20 wt %) | 185 (43 wt %) | 126 (30 wt %) |

(Total Weight: 427 g)

For the solid fuel samples respectively having compositions of Tables 1 to 5, it was measured whether they generated any noxious gas, offensive odors or smoke over a period of time from the ignition till the completion of catching on fire. The results are described in Table 6. The measurement was made using the five senses in a confined space. In particular, the generation of noxious gas was determined by whether or not the measurer felt dizzy.

TABLE 6

|  | Table 1 | Table 2 | Table 3 | Table 4 | Table 5 |
|---|---|---|---|---|---|
| Noxious gas | good | good | good | good | bad |
| Offensive Odors | good | good | good | good | bad |
| Smoke | good | good | good | good | bad |

Although the sample of Table 4 exhibited good results in the tests about noxious gas, offensive odors and smoke, it was undesirable because of its short burning time and its insufficient amount of heat both caused by a low content of its body portion.

As apparent from the above example, the solid fuel body according to the present invention can be practically used in cooking food in restaurants or barbecuing meats in parks because it almost completely eliminates the generation of noxious gas, offensive odors, and smoke while generating a sufficient amount of heat for a considerably long time.

What is claimed is:

1. A down burning solid fuel body including a fire-igniting layer, a fire-catching layer and a body portion, wherein the content ratio among the fire-igniting layer, fire-catching layer and body portion is 20 to 50:40 to 45:30 to 40 based on the weight ratio, the fire-igniting layer has a composition essentially consisting of 50 to 55 wt % fine charcoal, 25 to 30 wt % barium, 5 to 10 wt % potassium nitrate, 0.3 to 0.5 wt % zeolite, 0.3 to 0.5 wt % alum, and 5 to 10 wt % starch, the fire-catching layer has a composition essentially consisting of 60 to 65 wt % fine charcoal, 20 to 25 wt % barium, 5 to 10 wt % potassium nitrate, 0.1 to 0.3 wt % zeolite, 0.1 to 0.3 wt % alum, and 5 to 10 wt % starch, and the body portion has a composition essentially consisting of 85 to 90 wt % fine charcoal and 10 to 15 wt % starch.

* * * * *